US010310617B2

(12) United States Patent
Ekandem et al.

(10) Patent No.: US 10,310,617 B2
(45) Date of Patent: Jun. 4, 2019

(54) DRONE CONTROLLING DEVICE AND METHOD

(71) Applicant: Intel Corporation, Santa Clara, CA (US)

(72) Inventors: Joshua Ekandem, Beaverton, OR (US); Glen J. Anderson, Beaverton, OR (US); Lenitra M. Durham, Beaverton, OR (US); Richard T. Beckwith, Hillsboro, OR (US); Giuseppe Raffa, Portland, OR (US); Jamie Sherman, Portland, OR (US); Kathy Yuen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 14/737,322

(22) Filed: Jun. 11, 2015

(65) Prior Publication Data

US 2016/0364004 A1  Dec. 15, 2016

(51) Int. Cl.
| | | |
|---|---|---|
| *G05D 1/00* | (2006.01) | |
| *G06F 3/01* | (2006.01) | |
| *B64C 13/04* | (2006.01) | |
| *B64C 13/24* | (2006.01) | |
| *B64C 39/02* | (2006.01) | |
| *G05D 1/10* | (2006.01) | |
| *G08C 17/02* | (2006.01) | |

(52) U.S. Cl.
CPC .............. *G06F 3/017* (2013.01); *B64C 13/04* (2013.01); *B64C 13/24* (2013.01); *B64C 39/024* (2013.01); *G05D 1/0016* (2013.01); *G05D 1/0022* (2013.01); *G05D 1/0033* (2013.01); *G05D 1/101* (2013.01); *G08C 17/02* (2013.01); *B64C 2201/146* (2013.01)

(58) Field of Classification Search
CPC ................................ G06F 3/017; B64C 13/04
See application file for complete search history.

(56) References Cited

U.S. PATENT DOCUMENTS

| | | | |
|---|---|---|---|
| 9,459,620 B1 * | 10/2016 | Schaffalitzky | ....... G05D 1/0016 |
| 2010/0017114 A1 * | 1/2010 | Tehan | .................... G01C 21/00 |
| | | | 701/423 |
| 2012/0083947 A1 | 4/2012 | Anderson et al. | |

(Continued)

FOREIGN PATENT DOCUMENTS

KR  20110029607 A  3/2011

OTHER PUBLICATIONS

International Search Report and Written Opinion dated Oct. 21, 2016 for International Application No. PCT/US2016/030588, 15 pages.

(Continued)

*Primary Examiner* — Jess G Whittington
(74) *Attorney, Agent, or Firm* — Schwabe, Williamson & Wyatt, P.C.

(57) ABSTRACT

In embodiments, apparatuses, methods and storage media (transitory and non-transitory) are described that receive sensor data from one or more sensor devices that depict a user gesture in three dimensional space, determine a flight path based at least in part on the sensor data, and store the flight path in memory for use to control operation of a drone. Other embodiments may be described and/or claimed.

24 Claims, 8 Drawing Sheets

(56) References Cited

U.S. PATENT DOCUMENTS

| | | | |
|---|---|---|---|
| 2012/0232722 A1* | 9/2012 | Fisher | B64C 29/0033 |
| | | | 701/3 |
| 2014/0008496 A1 | 1/2014 | Ye et al. | |
| 2015/0002391 A1* | 1/2015 | Chen | G06F 3/017 |
| | | | 345/156 |
| 2015/0370258 A1* | 12/2015 | Fleureau | B64C 39/024 |
| | | | 701/3 |
| 2016/0041628 A1* | 2/2016 | Verma | G06F 3/0304 |
| | | | 345/156 |
| 2016/0117811 A1* | 4/2016 | Tariolle | A63H 27/12 |
| | | | 348/144 |
| 2016/0200421 A1* | 7/2016 | Morrison | B64C 13/18 |
| | | | 244/17.23 |
| 2016/0241767 A1* | 8/2016 | Cho | H04N 5/23203 |
| 2016/0259520 A1* | 9/2016 | Gatland | G01S 15/025 |
| 2016/0304217 A1* | 10/2016 | Fisher | B60L 11/1809 |
| 2016/0307449 A1* | 10/2016 | Gordon | G08G 5/0069 |

OTHER PUBLICATIONS

Accelerometer Based Hand Gesture Controlled Robot, http://www.engineersgarage.com/contribution/accelerometer-based-hand-gesture-controlled-robot, Sep. 10, 2015, 6 pages.

Hang Gesture Controlled Robot, https://www.youtube.com/watch?v=an9-y91G_yU, Sep. 10, 2015, 3 pages.

"Parrot Bebop Drone Skycontroller", http://www.parrot.com/usa/products/skycontroller, May 12, 2015, 23 pages.

Meghan Ottolini, "Intel Unleashes Smart Drones at CES 2015", http://www.crn.com/news/mobility/video/300075270/intel-unleashes-smart-drones-at-ces-2015.htm, Jan. 7, 2015, 2 pages.

\* cited by examiner

DRONE CONTROLLING DEVICE AND METHOD

TECHNICAL FIELD

The present disclosure relates to the field of remote or autonomous vehicles, in particular, to drone controlling apparatuses and methods.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Consumer drones are used in many contexts such as recreation, surveillance, environmental monitoring, and scientific research. Most consumer drones are typically controlled using a controller that may be similar to a game controller, a traditional joystick, or solely a 2D user interface on a smartphone or tablet control device. These types of controllers have limitations and may not be suitable for systems in which multiple drones may be selected for control, control using variations in acceleration is desired, or repeated complex patterns are desired.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

Figure 1:
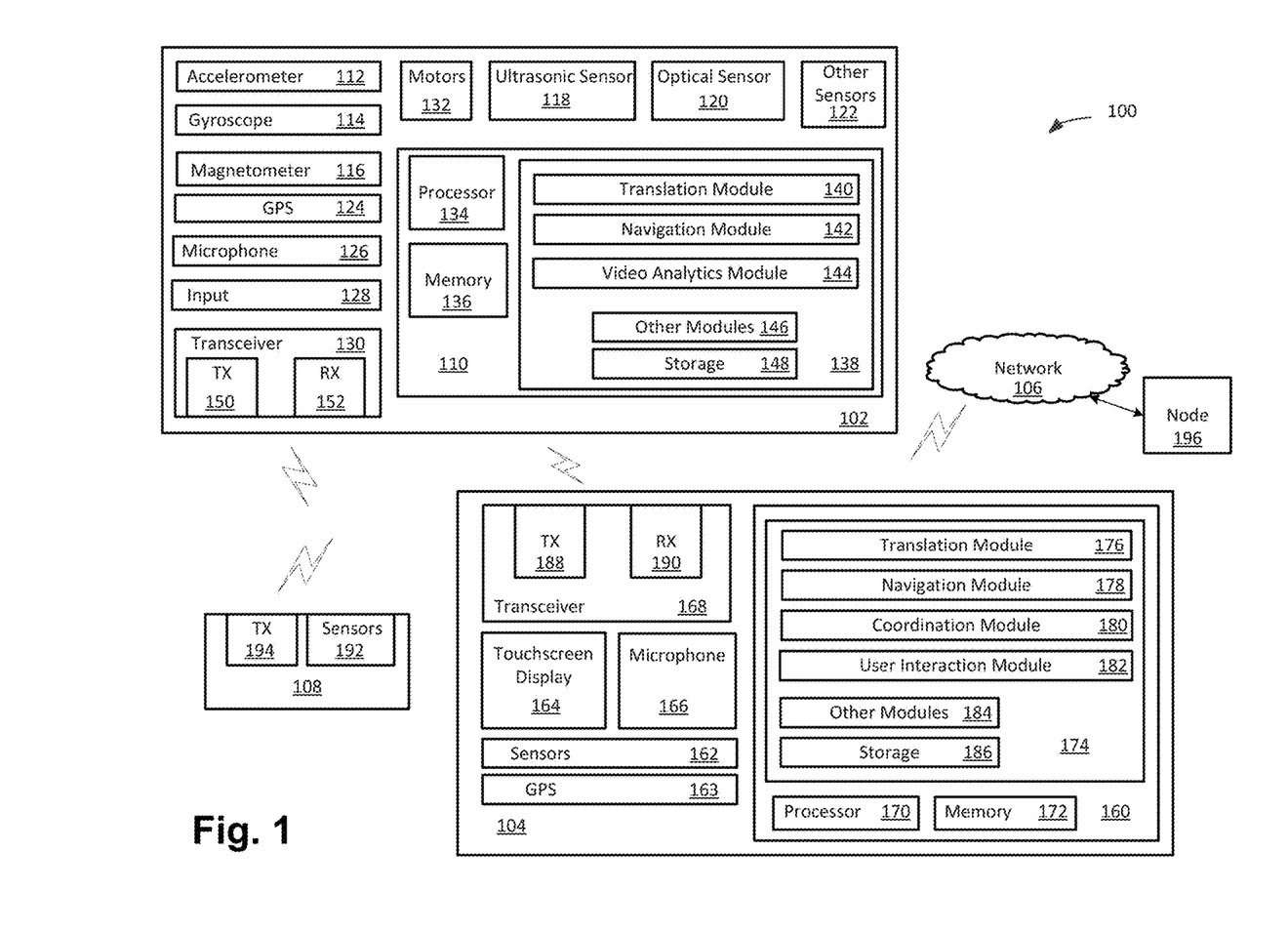
FIG. 1 is a block diagram of a drone environment including a drone system having drone control technology of the present disclosure, in accordance with various embodiments.

Referring now to FIG. 1, a drone environment 100, including a drone system 102 having drone control technology of the present disclosure, in accordance with various embodiments, is illustrated. In embodiments, the drone system 102 may be in wireless data communication with a mobile communications device 104, a communications network 106, or an object 108. In embodiments, more than one drone system 102 may be present in the drone environment 100. The drone system 102 may be included in a flying drone such as a quadcopter or may be included in a different type of remote controlled or autonomous vehicle such as a submarine or hovercraft, for example.

As shown, the drone system 102 may include a number of components 110-152, including a drone controlling device 110; various sensors that may include an accelerometer 112, a gyroscope 114, a magnetometer 116, an ultrasonic sensor 118, an optical sensor 120, or other sensors 122; a geographic positioning system (GPS) 124; a microphone 126; an input device 128; a transceiver 130; and motors 132. In embodiments, the other sensors 122 may include an inertial sensor or inertial measurement unit alternatively or in addition to the accelerometer 112 and the gyroscope 114. In various embodiments, the drone controlling device 110 may include a processor 134, a system memory 136, an execution environment 138, a translation module 140, a navigation module 142 and a video analytics module 144, that may be coupled together and configured to cooperate with each other to train and control a drone that may include the drone system 102. In embodiments, the execution environment 138 may also include other modules 146 and storage 148. The video analytics module 144 may include an object recognition module.

The transceiver 130 may include a transmitter 150 and a receiver 152 in various embodiments. The motors 132 may be used to drive propellers or other propulsion devices, in embodiments. The storage 148 may include navigation and rules data for drone behavior in various conditions and voice command to action mapping. The storage 148 may also include connectivity data, message storage, and sensor navigation data that may be associated with flight paths for drone navigation including motion, direction, force, and altitude. The other modules 146 may include a collision avoidance module or a security module for controlling access to drone operation, training, or digital contents. The transceiver 130 may be configured to communicate using one or more wireless communication methods such as IEEE 802.11x (WiFi), Bluetooth, or wireless cellular communication using a radio access network that may include a Global System for Mobile Communication (GSM), General Packet Radio Service (GPRS), Universal Mobile Telecommunications System (UMTS), High Speed Packet Access (HSPA), Evolved HSPA (E-HSPA), Long-Term Evolution (LTE) network, GSM Enhanced Data rates for GSM Evolution (EDGE) Radio Access Network (GERAN), Universal Terrestrial Radio Access Network (UTRAN), or Evolved UTRAN (E-UTRAN).

As shown, the mobile communications device 104 may include a number of components 160-190, including a drone controlling device 160; sensors 162 that may include one or more sensors such as an accelerometer, a gyroscope, a magnetometer, an ultrasonic sensor, an inertial sensor, an inertial measurement unit, an optical sensor, or other sensors; a GPS 163; a touchscreen display 164; a microphone 166; and a transceiver 168. In various embodiments, the drone controlling device 160 may include a processor 170, a system memory 172, an execution environment 174, a translation module 176, a navigation module 178, a coordination module 180, and a user interaction module 182, that may be coupled together and configured to cooperate with each other to train and control a drone. In embodiments, the execution environment may also include other modules 184 and storage 186. In embodiments, storage 186 may include navigational rules data for drone behavior in various conditions, and voice command to action mapping data. The transceiver 168 may include a transmitter 188 and a receiver 190 in various embodiments. The transceiver 168 may be configured to communicate using one or more wireless communication methods such as WiFi, Bluetooth, or wireless cellular communication in various embodiments.

In embodiments, the object 108 may include sensors 192 and a transmitter 194 to transmit sensor data. The sensors 192 may include one or more sensors such as an accelerometer, a gyroscope, a magnetometer, or other sensors. In some embodiments, additional components such as a receiver, processor, or memory may be included in the object 108. The object 108 may be a ball or other object intended to be thrown or otherwise moved by a user, with the sensors 192 generating data corresponding to a movement path of the object 108 that is transmitted by the transmitter 194. In embodiments, the drone system 102 or the mobile communications device 104 may receive the sensor data transmitted by the object 108 so the drone control device 110 or 160 may determine a flight path to control a drone to mimic the movement path of the object 108. In embodiments, the drone system 102 or the mobile communications device may be in data communication with a node 196, over the network 106. The node 196 may be a computing node including one or more servers.

Figure 2:
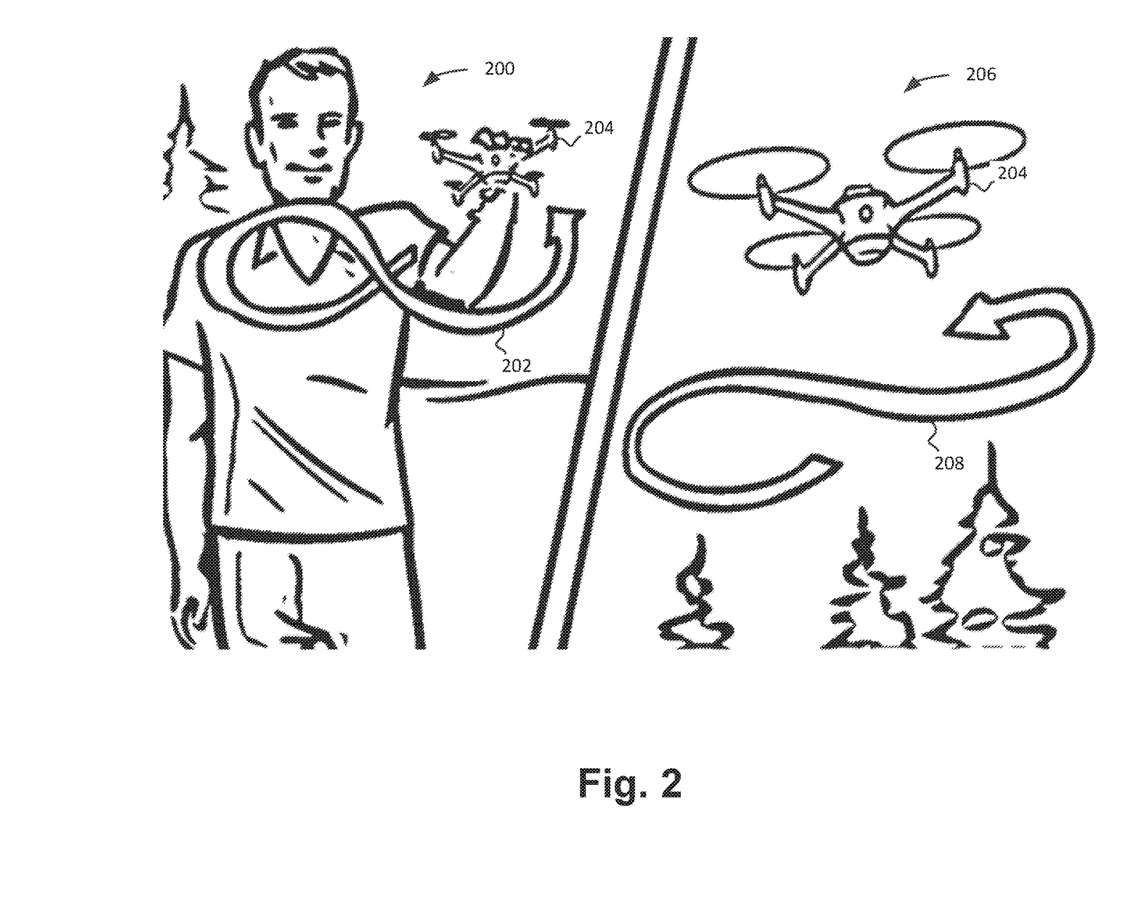
FIG. 2 is a diagram of a drone training gesture using a drone, and a corresponding drone flight path, in accordance with various embodiments.

FIG. 2 is a diagram of a drone training session 200 showing a user drone training gesture along a training path 202 using a drone 204, and a drone flight session 206 showing the drone 204 later flying along a drone flight path 208 that corresponds to the drone training path 202, in accordance with various embodiments. The drone 204 may include the drone system 102, in embodiments. As shown, the drone 204 may be a quadcopter design, but other drone designs may be used in various embodiments. The training path 202 is shown as a figure-eight gesture. The flight path 208 is also shown as a figure-eight pattern, corresponding to the training path 202. In embodiments, the flight path 208 may be a scaled and/or smoothed version of the training path 202. In some embodiments, a user may gesture multiple times with the drone 204 along a desired training path, and the flight path 208 may be based at least in part on an average or smoothed version of the multiple training path gestures.

Figure 3:
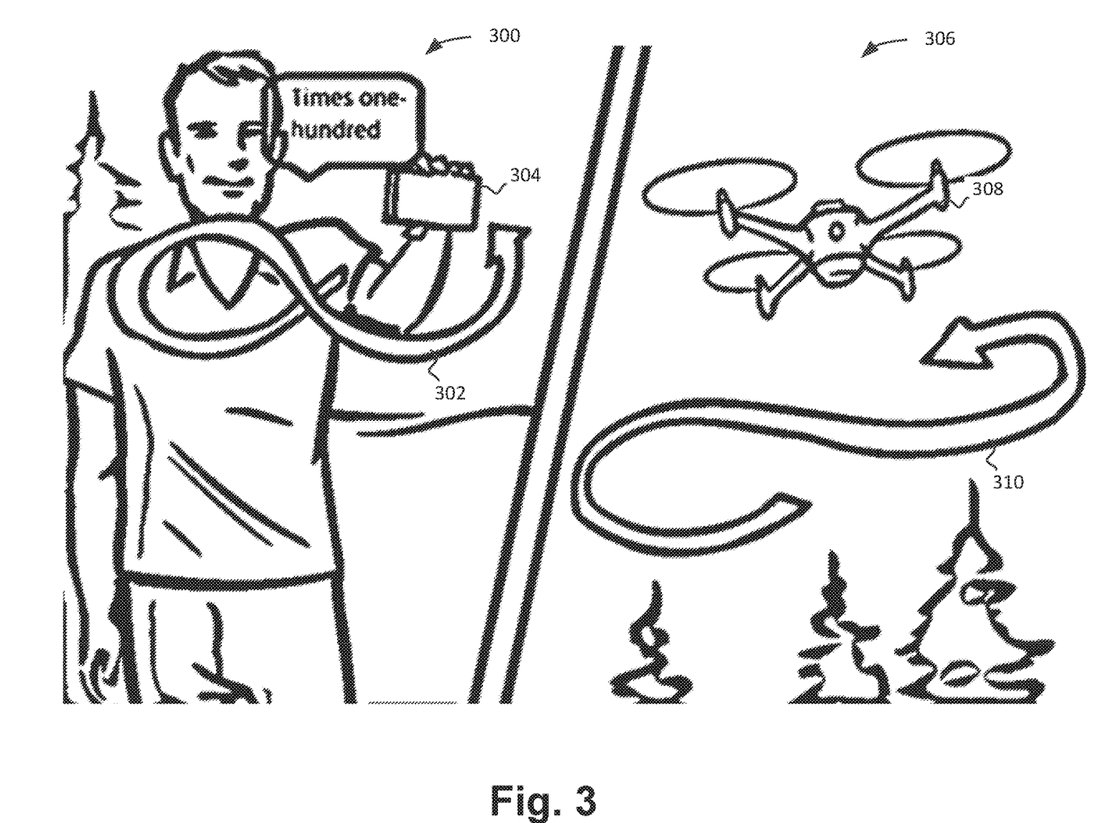
FIG. 3 is a diagram of a drone training gesture using a mobile communications device, and a corresponding drone flight path, in accordance with various embodiments.

FIG. 3 is a diagram of a drone training session 300 showing a user drone training gesture along a training path 302 using a mobile communications device 304, and a drone flight session 306 showing a drone 308 later flying along a drone flight path 310 that corresponds to the training path 302, in accordance with various embodiments. The mobile communications device 304 may be a smartphone in various embodiments and may be configured as described with respect to the mobile communications device 104. As shown, the drone 308 may be a quadcopter design, but other drone designs may be used in various embodiments. The training path 302 is shown as a figure-eight gesture. The flight path 310 is also shown as a figure-eight pattern, corresponding to the training path 302.

In embodiments, the flight path 310 may be a scaled and/or smoothed version of the training path 302. In some embodiments, a user may gesture multiple times with the mobile communications device 204 along a desired training path, and the flight path 310 may be based at least in part on an average or smoothed version of the multiple training path gestures. One or more voice commands may also be used in the drone training session 300. For example, a repetition or a scale command may be presented to the mobile communications device 304. A user may, for example, say "times one hundred" to magnify the scale of the training path 302 when the drone 308 flies the corresponding flight path 310. Alternatively, or in addition, a repetition voice command may be presented to repeat the gesture of the training path 302 a particular number of times given in the repetition command when the drone 308 flies the flight path 310.

Figure 4:
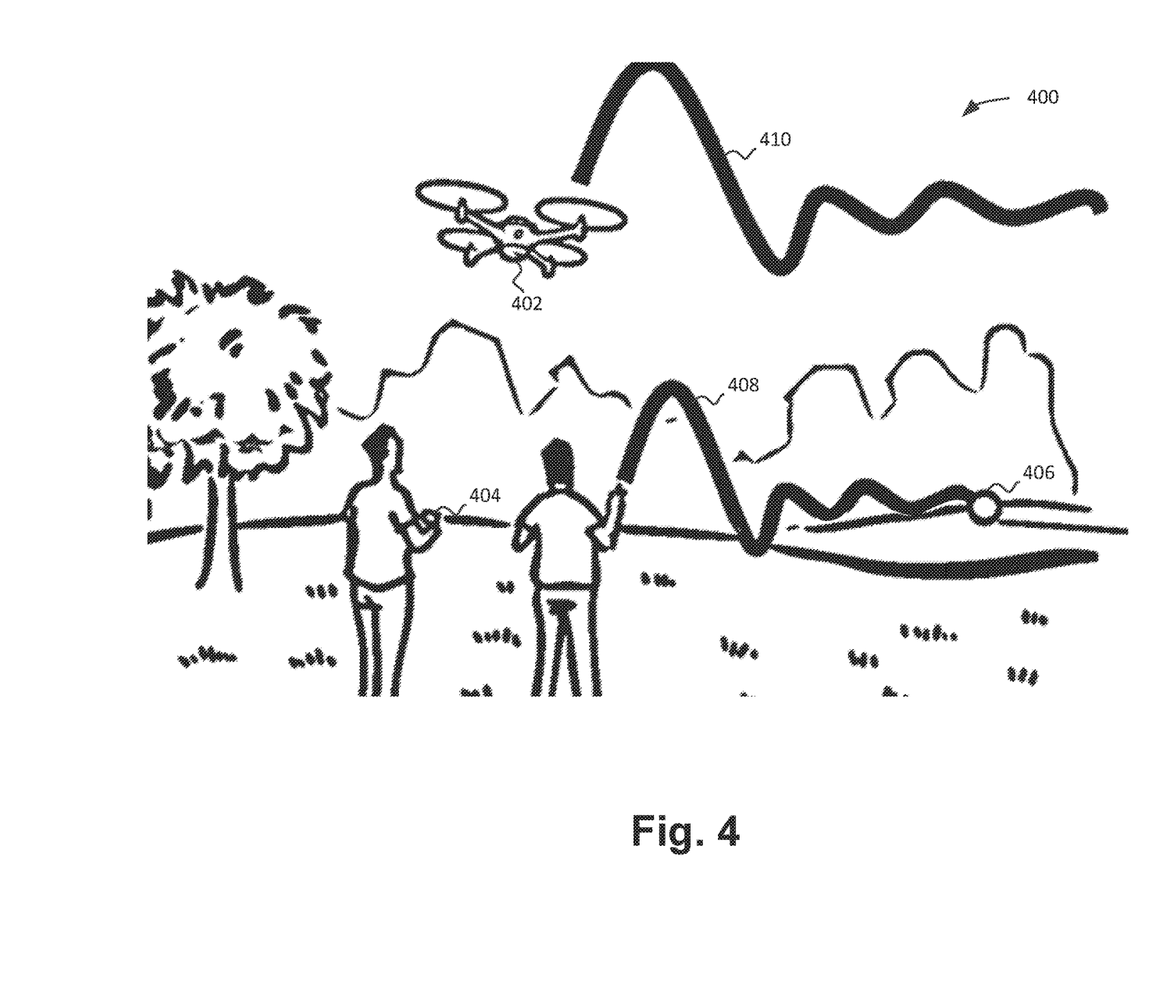
FIG. 4 is a diagram of a drone flight path that mimics a movement path of an object, in accordance with various embodiments.

FIG. 4 is a diagram of drone flight session 400 showing a drone 402 being controlled by a mobile communications device 404, a ball 406 that traveled along a movement path 408, and a drone flight path 410 that mimics the movement path 408 of the ball 406, in accordance with various embodiments. In embodiments, the drone 402 may include the drone system 102 and the mobile communications device 404 may be configured as described with respect to the mobile communications device 104. In embodiments, the ball 406 may be an implementation of the object 108 described with respect to FIG. 1. The sensors 192 in the ball 406 may sense acceleration, position, or movement, such as with accelerometers, gyroscopes, and a magnetometer that may be included in an inertial measurement unit that may be included in the ball 406. Sensor data from the sensors may be transmitted by the transmitter 194, and received by the drone 402. The movement path 408 of the ball 406 may be determined based at least in part on the received sensor data, and the flight path 410 for the drone 402 may be determined based at least in part on the movement path 408 such that the drone 402 mimics the movement path 408 of the ball 406 when it is directed to fly along the flight path 410. In some embodiments, the drone 402 may track the ball 406 using a tracking sensor such as an optical sensor, a camera or a video camera and determine the movement path 408 based at least in part on the tracking sensor data rather than, or in addition to, determining the movement path 408 of the ball 406 based on sensor data from the ball 406.

Figure 5:
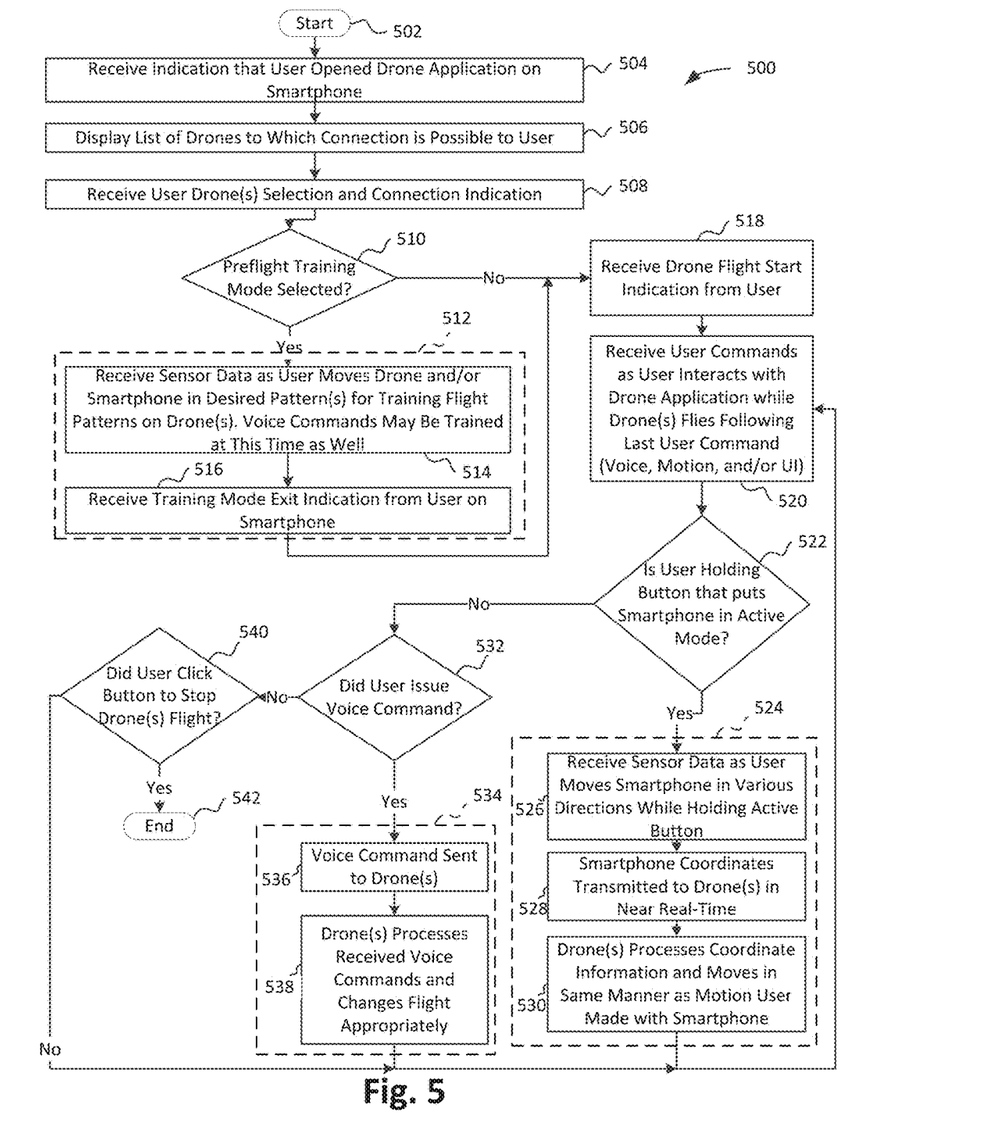
FIG. 5 is a flow diagram of an example process of training and controlling a drone that may be implemented on various computing devices described herein, in accordance with various embodiments.

FIG. 5 is a flow diagram of an example process 500 of training and controlling a drone that may be implemented on various computing devices described herein, in accordance with various embodiments. In various embodiments, some or all of the process 500 may be performed by translation module 176, the navigation module 178, the coordination module 180, the user interaction module 182, or other modules 184 of the drone controlling device 160, or the translation module 140, the navigation module 142, the video analytics module 144 or other modules 146 of the drone controlling device 110 described with respect to FIG. 1. In other embodiments, the process 500 may be performed with more or less modules and/or with some operations in different order.

As shown, for embodiments, the process 500 may start at a block 502. At a block 504, an indication that a user opened a drone application on a smartphone such as the mobile communications device 104 may be received. In embodiments, the drone application may include the translation module 176, the navigation module 178, the coordination module 180, the user interaction module 182, and other modules 184. At a block 506, a list of drones to which connection is possible may be displayed to the user, such as by presenting the list on the touchscreen display 164. In embodiments, the list of drones may be determined based at least in part on a discovery process using a wireless communications mechanism such as Bluetooth. In some embodiments, the list may be based at least in part on drones that have been previously identified in a registration process. In embodiments, drones may be identified by a serial number or other identifier. In some embodiments, a list may be obtained from the node 196. At a block 508, a user drone or drones selection and connection indication may be received. In embodiments, the connection indication may include an indication that the user has pressed a connect button. In embodiments, the user may be able to select a single drone from the list of drones. In other embodiments, the user may be able to select more than one drone to be trained and/or flown concurrently. In embodiments, the user interaction module 182 may be operated by the processor 170 to present the list of drones on the touchscreen display 164 at the block 506 and respond to the user press of the connect button that may be a button presented on the touchscreen display 164 at the block 508. The coordination module 180 may be operated by the processor 170 to provide drone to control mechanism mapping based at least in part on the drone selection.

At a decision block 510, it may be determined whether a preflight training mode has been selected. In embodiments, the user interaction module 182 may be operated by the processor 170 to present a user interface including an option to select a preflight training mode. If, at the decision block 510, it is determined that a preflight training mode has been selected, the process 500 may proceed to a preflight training mode at a block 512. At a block 514, sensor data may be received as a user moves a drone and/or smartphone in a desired pattern or patterns, such as the training path 202 or the training path 302 described with respect to FIG. 2 or FIG. 3, respectively, for training flight patterns on the selected drone or drones. In embodiments, if a smartphone is used for the preflight training, the sensors 162 or the GPS 163 may generate sensor data during movement of the smartphone along the training path. The translation module 176 may be operated by the processor 170 to receive the sensor data, determine a flight path based at least in part on the sensor data, and store the flight path in the memory 172 or storage 186. If a drone is used for the preflight training, one or more of the accelerometer 112, the gyroscope 114, the magnetometer 116, the ultrasonic sensor 118, the optical sensor 120, other sensors 122, or the GPS 124 may generate sensor data during movement of the drone along the training path. The translation module 140 may be operated by the processor 134 to receive the sensor data, determine a flight path based at least in part on the sensor data, and store the flight path in the memory 136 or storage 148. In embodiments, determining the flight path may include smoothing sensor data corresponding to user gesture movements. In embodiments, the flight path may be stored with an associated identifier that may allow the flight path to be later retrieved using the identifier. For example, an identifier may be used such as 'Figure-8', 'Figure-8, scale 10', 'Figure-8, repeat 5', 'Figure-8, scale 10 & repeat 5', or loop-de-loop'. Simple identifiers such as 'A', 'B', '1', '2', or 'A1' may also be used in various embodiments.

In embodiments, voice commands may also be trained at the block 514. If a smartphone is used for the preflight training, the microphone 166 may receive the voice command and the translation module 176 may be operated by the processor 170 to determine the flight path also based at least in part on the received voice command. For example, the voice command may include a scale or repetition command and the translation module may scale or repeat the flight path accordingly. If a drone is used for the preflight training, the microphone 126 may receive the voice command and the translation module 140 may be operated by the processor 134 to determine the flight path also based at least in part on the received voice command. At a block 516, a training mode exit indication may be received from the user on the smartphone. In embodiments, the training mode exit indication may be received on a drone system rather than the smartphone.

If it was determined that preflight training mode was not selected at the decision block 510, or following user exit of training mode at the block 516, the process 500 may proceed to a block 518 where a drone flight start indication may be received from a user to start a flight of the selected drone or drones. In embodiments, a user may start flight of the selected drone(s) by activating a flight mode using input 128, or by selecting a flight mode option that may be presented by the user interaction module 182. In embodiments, if the drone(s) are to fly autonomously initially, they may follow the most recently stored flight path, or may follow a flight path selected using an identifier associated with the flight path. The drone(s) may first fly in a default pattern before starting the stored flightpath, such as by flying upward 20 feet before beginning the flight path, for example, in some embodiments. In embodiments, if the user starts the drone(s) flight with the smartphone, the user may start the flight of the drone using a voice command, active motion of the smartphone, or through user interface interaction on the touchscreen display 164. For example, the user may hold an active mode button presented on the touchscreen display 164 and lift the smartphone in the air to direct the drone to rise into the air from a resting position. In embodiments, the user may direct the drone(s) to follow the most recently trained and/or stored flight path, or may select a different flight path such as by selecting an identifier associated with an earlier trained flight path. In some embodiments, a flight path may be stored on the node 196 and retrieved over the network 106. In embodiments, the various indications for starting drone flight may be received by the user interaction module 182, or alternatively by a module operating on the drone system 102.

At a block 520, user commands may be received as the user interacts with the drone application on the smartphone while the drone(s) fly following a last user command that may be a voice, motion, or user interface (UI) command, in various embodiments. At a decision block 522, it may be determined whether the user is holding a button that puts the smartphone in active mode. If, at the decision block 522, it is determined the user is holding a button that puts the smartphone in active mode, the process 500 may proceed to a block 524 where gesture control of the drone via smartphone may be performed. In embodiments, the gesture control may include a user selectable standard mode or force to scale mode. In embodiments, in force to scale mode, a faster movement of the smartphone (which may include larger relative acceleration and deceleration of the phone) may indicate bigger desired movements for the drone. In force to scale mode, the drone may be directed to fly in a manner proportional to the speed of movement of the smartphone in various embodiments. In some embodiments, the drone may be directed to fly in a manner proportional to an acceleration of the smartphone. In standard mode speed of movement of the smartphone may not be used so that the user may be able to make more intricate movements of the smartphone without worrying about the timing of the gesture or effect. In embodiments, the user interaction module 182 may allow the user to selectively control between the standard and force to scale modes. In embodiments, the drone direction and altitude may correspond to the direction and altitude of a user's smartphone (e.g., the drone may mimic the three dimensional movements of the user's smartphone).

At a block 526, sensor data may be received as the user moves the smartphone in various directions while holding an active mode button on the smartphone. For example, if the user is holding the smartphone with the camera pointed in the north direction, the user may move the smartphone to the left or right to direct the drone(s) to hover in a more westerly or easterly direction, respectively. In embodiments, the directions may be reversed with respect to the left or right movement of the smartphone, or may be user selectable. At a block 528, the smartphone coordinates or other sensor data may be transmitted to one or more drones in near real-time. At a block 530, the drone(s) may process the coordinate information or other sensor data and move in the same manner as the motion the user made with the smartphone. In other embodiments, the smartphone may process the coordinate information or other sensor data and transmit an altered flight path to the drone rather than sending coordinate or other sensor data to be processed by the drone. The process 500 may then return to the block 520, in various embodiments.

If, at the decision block 522, it was determined that the user is not holding a button that puts the smartphone in active mode, the process 500 may proceed to a decision block 532 where it may be determined whether the user issued a voice command. In embodiments, the translation module 176 may be operated by the processor 170 to monitor the microphone 166 for voice commands that may be issued by a user. If, at the decision block 532, it was determined the user issued a voice command, the process 500 may proceed to a block 534 where voice command control may be performed. At a block 536, a voice command may be sent to the drone(s). At a block 538, the drone(s) may process the received voice commands and change flight appropriately. In other embodiments, the smartphone may process the voice command and transmit an altered flight path to the drone rather than sending the voice command to the drone to be processed. In various embodiments, the process 500 may then return to the block 520.

If, at the decision block 522, it was determined that the user did not issue a voice command, the process 500 may proceed to a decision block 540 where it may be determined whether the user clicked a button to stop the drone(s) flight. If, at the decision block 540, it is determined the user clicked a button to stop the drone(s) flight, the process 500 may proceed to a block 542 where the process 500 may end by landing the drone. In some embodiments, the drone may be directed to land at its starting point or within a predefined distance from its starting point. In embodiments, the drone may be directed to land within a predefined distance from the current location of the smartphone. If, at the decision block 540, it is determined the user did not click a button to stop the drone(s) flight, the process 500 may return to the block 520.

Figure 6:
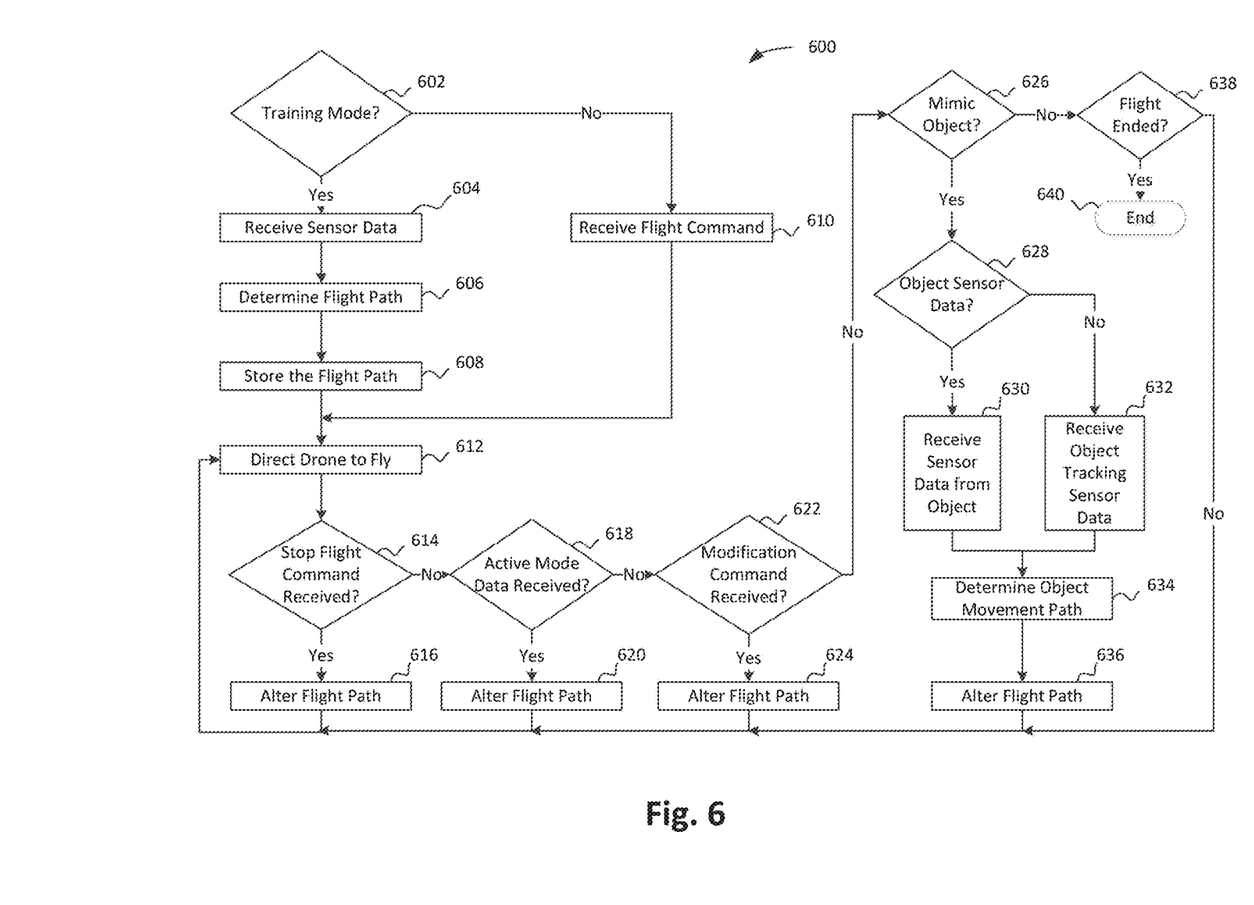
FIG. 6 is a flow diagram of another example process of training and controlling a drone that may be implemented on various computing devices described herein, in accordance with various embodiments.

FIG. 6 is a flow diagram of another example process 600 of training and controlling a drone that may be implemented on various computing devices described herein, in accordance with various embodiments. In various embodiments, some or all of the process 600 may be performed by translation module 176, the navigation module 178, the coordination module 180, the user interaction module 182, or other modules 184 of the drone controlling device 160, or the translation module 140, the navigation module 142, the video analytics module 144 or other modules 146 of the drone controlling device 110 described with respect to FIG. 1. In other embodiments, the process 600 may be performed with more or less modules and/or with some operations in different order.

As shown, for embodiments, the process 600 may start at a decision block 602 where it may be determined whether a training mode has been entered. In embodiments, a user may select the training mode using the input 128 or a user interface presented by the user interaction module 182. If, at the decision block 602, it is determined a training mode has been entered, the process 600 may proceed to a block 604 where sensor data may be received. In embodiments, the sensor data may be from one or more of the accelerometer 112, the gyroscope 114, the magnetometer 116, the ultrasonic sensor 118, the optical sensor 120, other sensors 122, the GPS 124, sensors 162, or GPS 163. The sensor data may correspond to and depict a user gesture in three dimensional space of a drone having the drone system 102 or a user gesture of the mobile communications device 104 in various embodiments. The translation module 140 or the translation module 176 may receive the sensor data.

At a block 606, a flight path may be determined based at least in part on the received sensor data. At a block 608, the flight path may be stored. In embodiments, the flight path may be stored in the memory 136, storage 148, memory 172, storage 186, or node 196. In embodiments, the translation module 140 may be operated by the processor 134 or the translation module 176 may be operated by the processor 170 to determine and store the flight path. Following storage of the flight path at the block 608, the process 600 may proceed to a block 612 where the drone may be directed to fly based at least in part on the stored flight path. In embodiments, the navigation module 142 may be operated by the processor 134 or the navigation module 178 may be operated by the processor 170 to direct the drone to fly. If, at the decision block 602, it was determined a training mode has not been entered, the process 600 may proceed to a block 610 where a flight command may be received. In embodiments, the flight command may be received at the microphone 126 or input 128. In other embodiments, the flight command may be received at the microphone 166, through a motion of the mobile communications device 104, or using a user interface presented on the touchscreen display 164. In embodiments, the process 600 may then proceed to the block 612 where the drone may be directed to fly based at least in part on a current flight path. In embodiments, navigation module 142 or navigation module 178 may direct the drone to fly.

At a decision block 614, it may be determined whether a stop flight command has been received. If, at the decision block 614, it is determined a stop flight command has been received, the process 600 may proceed to a block 616 where the flight path may be altered based at least in part on the stop flight command. In embodiments, the flight path may be altered to include a return to a drone starting point or a point within a predefined distance of the drone starting point. In embodiments, the flight path may be altered to include flying to a current location of a mobile communications device or within a predefined distance of a mobile communications device. In embodiments, the navigation module 142 or the navigation module 178 may receive the stop flight command and alter the flight path accordingly. The process 600 may then return to the block 612 where the drone may be directed to fly based at least in part on the altered flight path.

If, at the decision block 614, it was determined a stop flight command had not been received, the process 600 may proceed to a decision block 618, where it may be determined whether active mode data has been received. In embodiments, the active mode data may be received by the navigation module 142 via the transceiver 130 from the mobile communications device 104. In embodiments, the active mode data may include one or more of sensor data, coordinate information, an altered flight path, mode selection (active, force to scale, standard), or other information. If active mode data has been received, the process 600 may proceed to a block 620 where the flight path may be altered based at least in part on the received active mode data. In embodiments, the navigation module may be operated by the processor 134 to alter the flight path. The process 600 may then return to the block 612 where the drone may be directed to fly based at least in part on the altered flight path.

If, at the decision block 618, it was determined that active mode data has not been received, the process 600 may proceed to a decision block 622 where it may be determined whether a modification command has been received. In embodiments, the modification command may be a scale or repetition voice command received by the drone system 102 from the mobile communications device 104, for example. If a modification command has been received, the process 600 may proceed to a block 624, were the flight path may be altered based at least in part on the received modification command. In embodiments, the navigation module 142 may receive the modification command and alter the flight path accordingly. The process 600 may then return to the block 612 where the drone may be directed to fly based at least in part on the altered flight path.

If, at the decision block 622, it was determined that a modification command has not been received, the process 600 may proceed to a decision block 626 where it may be determined whether an object is to be mimicked. In embodiments, the navigation module 142 may receive an indication from the mobile communications device 104 that there is an object to be mimicked. If, at the decision block 626, it is determined an object is to be mimicked, the process 600 may proceed to a decision block 628 where it may be determined whether object sensor data is available. If object sensor data is available, the process 600 may proceed to a block 630 where sensor data from an object may be received. In embodiments, the sensor data may be from sensors 192 in an object such as the ball 406 shown in FIG. 4.

If object sensor data is not available, the process 600 may proceed to a block 632, where object tracking sensor data may be received. The tracking sensor data may be from optical sensor 120, ultrasonic sensor 118, or other sensors 122 such as a radar device, for example. In embodiments, the drone may be directed to track an object such as an animal (e.g., an insect or a bird) based at least in part on the tracking sensor data. In some embodiments, the drone may track an object such as a ball without sensors based at least in part on a training process to recognize the ball using optical or other sensors, which may include learning a particular color or color pattern on the ball or other object.

The process 600 may then proceed to a block 634 where an object movement path may be determined based at least in part on the received sensor data from the object or the received object tracking sensor data. Navigation module 142 may be operated by the processor 134 to determine the path based at least in part on the received sensor data or object tracking sensor data. In some embodiments, video analytics module 144 may be operated by the processor 134 to determine the path based on optical sensor data. At a block 636, the flight path may be altered based at least in part on the determined object movement path. In embodiments, the process 600 may then return to the block 612 where the drone may be directed to fly based at least in part on the altered flight path.

If, at the decision block 626, it was determined an object was not to be mimicked, the process 600 may proceed to a decision block 638 where it may be determined whether the flight has ended. In embodiments, the navigation module 142 may receive data from one or more sensors to determine if the drone is at rest. If the flight has not ended, the process 600 may return to the block 612 where the drone may be directed to fly based at least in part on the current flight path. If the flight has ended, the process 600 may end at a block 640.

Figure 7:
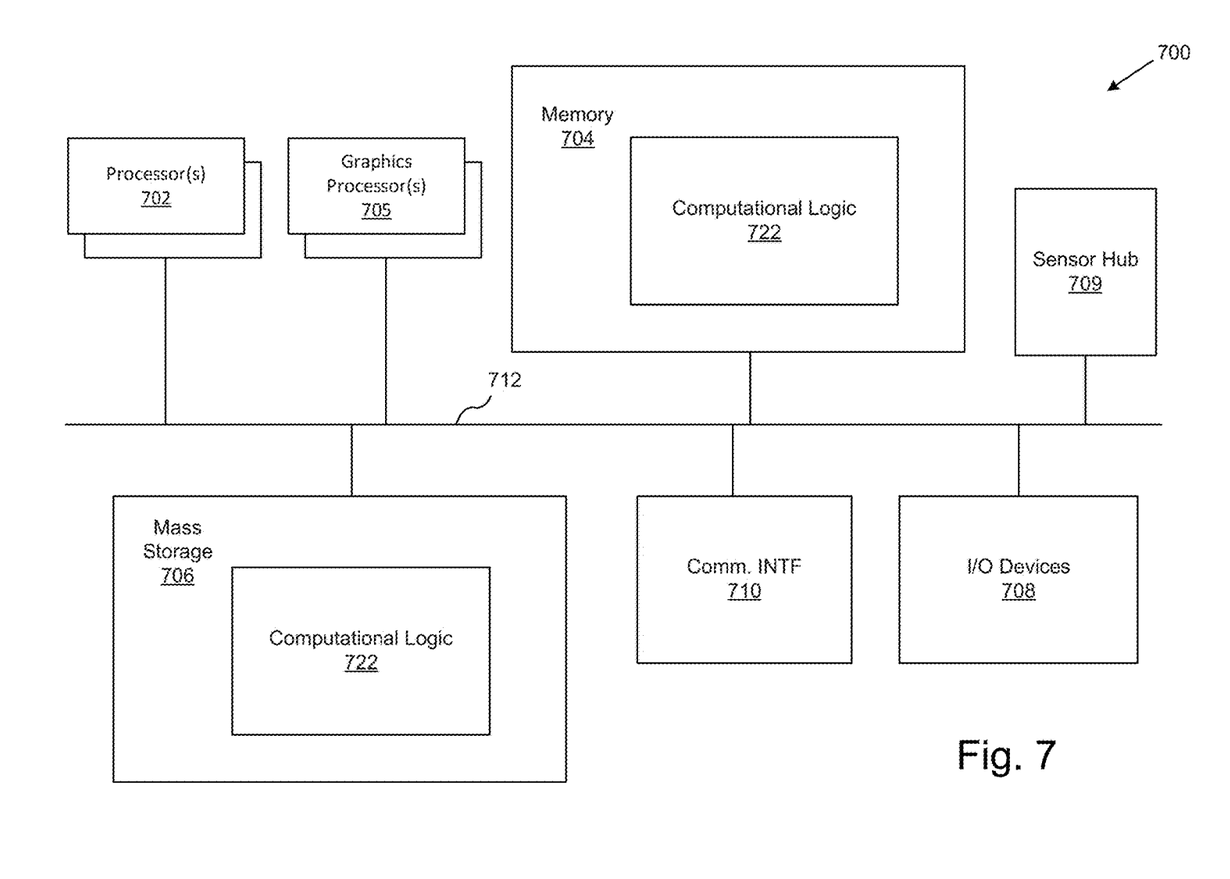
FIG. 7 illustrates an example computing environment suitable for practicing various aspects of the disclosure, in accordance with various embodiments.

Referring now to FIG. 7, an example computer 700 suitable to practice the present disclosure as earlier described with reference to FIGS. 1-6 is illustrated in accordance with various embodiments. As shown, computer 700 may include one or more processors or processor cores 702, and system memory 704. For the purpose of this application, including the claims, the term "processor" refers to a physical processor, and the terms "processor" and "processor cores" may be considered synonymous, unless the context clearly requires otherwise. Additionally, computer 700 may include one or more graphics processors 705, mass storage devices 706 (such as diskette, hard drive, compact disc read only memory (CD-ROM) and so forth), input/output devices 708 (such as display, keyboard, cursor control, remote control, gaming controller, image capture device, and so forth), sensor hub 709, and communication interfaces 710 (such as network interface cards, modems, infrared receivers, radio receivers (e.g., Bluetooth), and so forth). The elements may be coupled to each other via system bus 712, which may represent one or more buses. In the case of multiple buses, they may be bridged by one or more bus bridges (not shown).

The communication interfaces 710 may include one or more communications chips that may enable wired and/or wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication interfaces 710 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The communication interfaces 710 may include a plurality of communication chips. For instance, a first communication chip may be dedicated to shorter range wireless communications such as Wi-Fi and Bluetooth, and a second communication chip may be dedicated to longer range wireless communications such as GPS, EDGE, GPRS, CDMA, WiMAX, LTE, Ev-DO, and others.

Each of these elements may perform its conventional functions known in the art. In particular, system memory 704 and mass storage devices 706 may be employed to store a working copy and a permanent copy of the programming instructions implementing the operations associated with the drone system 102 or the mobile communications device 104, e.g., operations described for translation module 140, navigation module 142, video analytics module 144, other modules 146, storage 148, translation module 176, navigation module 178, coordination module 180, user interaction module 182, other modules 184, or storage 186, shown in FIG. 1, or operations shown in process 500 of FIG. 5 or process 600 of FIG. 6, collectively denoted as computational logic 722. The system memory 704 and mass storage devices 706 may also be employed to store a working copy and a permanent copy of the programming instructions implementing the operations associated with an OS running on the drone system 102 or mobile communications device 104. The system memory 704 and mass storage devices 706 may also be employed to store the data or local resources in various embodiments. The various elements may be implemented by assembler instructions supported by processor(s) 702 or high-level languages, such as, for example, C, that can be compiled into such instructions.

The permanent copy of the programming instructions may be placed into mass storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 702-722 may vary, depending on whether computer 700 is a stationary computing device, such as a server, high performance computing node, set-top box or desktop computer, a mobile computing device such as a tablet computing device, laptop computer or smartphone, or an embedded computing device. Their constitutions are otherwise known, and accordingly will not be further described. In various embodiments, different elements or a subset of the elements shown in FIG. 7 may be used. For example, some devices may not include the graphics processor 705, may use a unified memory that serves as both memory and storage, or may couple sensors without using a sensor hub.

Figure 8:
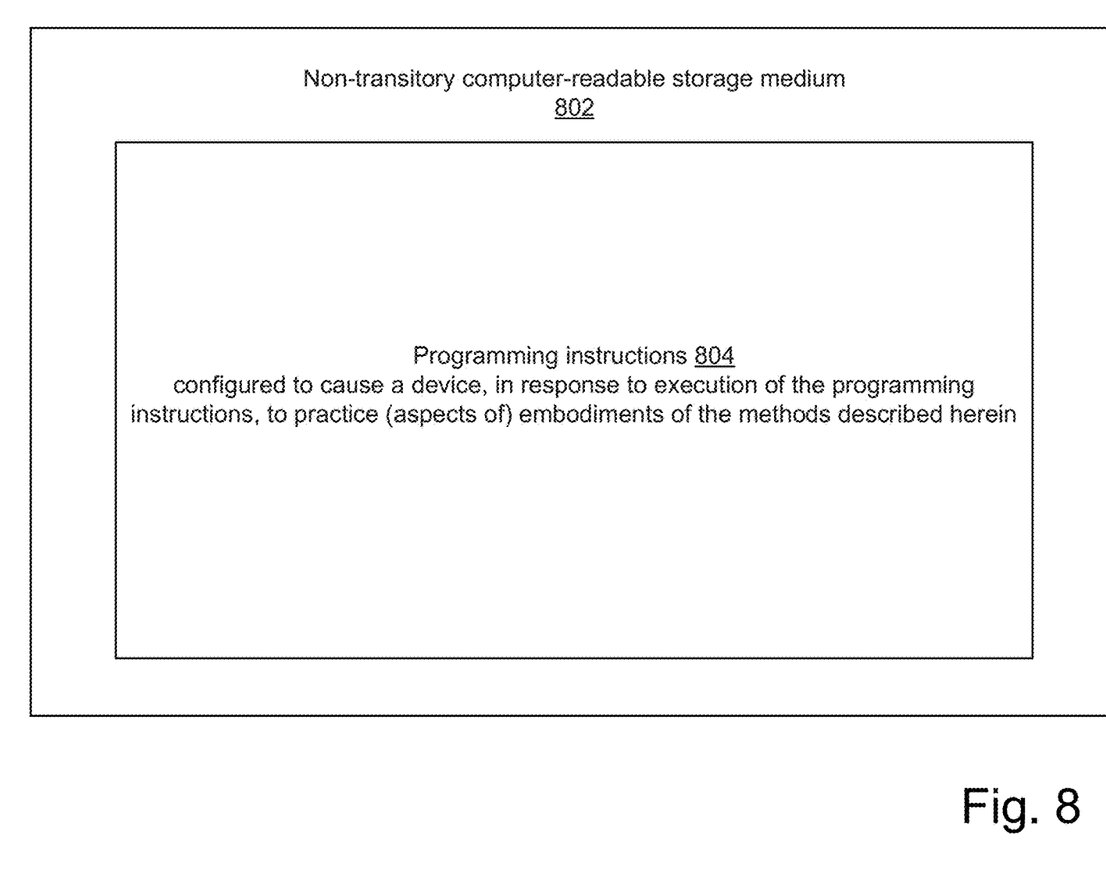
FIG. 8 illustrates an example storage medium with instructions configured to enable an apparatus to practice various aspects of the present disclosure, in accordance with various embodiments.

FIG. 8 illustrates an example at least one non-transitory computer-readable storage medium 802 having instructions configured to practice all or selected ones of the operations associated with the drone system 102 or mobile communications device 104, earlier described, in accordance with various embodiments. As illustrated, at least one non-transitory computer-readable storage medium 802 may include a number of programming instructions 804. The storage medium 802 may represent a broad range of persistent storage medium known in the art, including but not limited to flash memory, dynamic random access memory, static random access memory, an optical disk, a magnetic disk, etc. Programming instructions 804 may be configured to enable a device, e.g., computer 700, drone system 102, or mobile computing device 104 in response to execution of the programming instructions 804, to perform, e.g., but not limited to, various operations described for translation module 140, navigation module 142, video analytics module 144, other modules 146, storage 148, translation module 176, navigation module 178, coordination module 180, user interaction module 182, other modules 184, or storage 186, shown in FIG. 1, or operations shown in process 500 of FIG. 5 or process 600 of FIG. 6. In alternate embodiments, programming instructions 804 may be disposed on multiple computer-readable storage media 802. In alternate embodiments, storage medium 802 may be transitory, e.g., signals encoded with programming instructions 804.

Referring back to FIG. 7, for an embodiment, at least one of processors 702 may be packaged together with memory having computational logic 722 configured to practice aspects described for translation module 140, navigation module 142, video analytics module 144, other modules 146, storage 148, translation module 176, navigation module 178, coordination module 180, user interaction module 182, other modules 184, or storage 186, shown in FIG. 1, or operations shown in process 500 of FIG. 5 or process 600 of FIG. 6. For an embodiment, at least one of processors 702 may be packaged together with memory having computational logic 722 configured to practice aspects described for translation module 140, navigation module 142, video analytics module 144, other modules 146, storage 148, translation module 176, navigation module 178, coordination module 180, user interaction module 182, other modules 184, or storage 186, shown in FIG. 1, or operations shown in process 500 of FIG. 5 or process 600 of FIG. 6 to form a System in Package (SiP). For an embodiment, at least one of processors 702 may be integrated on the same die with memory having computational logic 722 configured to practice aspects described for translation module 140, navigation module 142, video analytics module 144, other modules 146, storage 148, translation module 176, navigation module 178, coordination module 180, user interaction module 182, other modules 184, or storage 186, shown in FIG. 1, or operations shown in process 500 of FIG. 5 or process 600 of FIG. 6. For an embodiment, at least one of processors 702 may be packaged together with memory having computational logic 722 configured to practice aspects of translation module 140, navigation module 142, video analytics module 144, other modules 146, storage 148, translation module 176, navigation module 178, coordination module 180, user interaction module 182, other modules 184, or storage 186, shown in FIG. 1, or operations shown in process 500 of FIG. 5 or process 600 of FIG. 6 to form a System on Chip (SoC). For at least one embodiment, the SoC may be utilized in, e.g., but not limited to, a mobile computing device such as a wearable device and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include an electronic drone controlling device comprising: one or more processors; a memory coupled with the one or more processors; a translation module operated by the one or more processors to: receive sensor data from one or more sensor devices that depict a user gesture in three dimensional space; determine a flight path based at least in part on the sensor data; and store the flight path in the memory for use to control operation of a drone.

Example 2 may include the subject matter of Example 1, wherein the one or more sensor devices include at least one of a position sensor, an accelerometer, a gyroscope, a magnetometer, an ultrasonic sensor, an inertial sensor, or an optical sensor.

Example 3 may include the subject matter of any one of Examples 1-2, wherein the drone includes the one or more sensor devices, and the user gesture is made using the drone.

Example 4 may include the subject matter of any one of Examples 1-3, further comprising a navigation module operated by the one or more processors to direct the drone to fly based at least in part on the flight path.

Example 5 may include the subject matter of Example 4, wherein the navigation module is further to: receive a flight modification command from a mobile communications device; alter the flight path based at least in part on the flight modification command; and direct the drone to fly based at least in part on the altered flight path.

Example 6 may include the subject matter of Example 5, wherein the flight modification command includes at least one of a scale command or a repetition command.

Example 7 may include the subject matter of any one of Examples 5-6, wherein the flight modification command is a voice command.

Example 8 may include the subject matter of any one of Examples 4-7, wherein the navigation module is further to: receive active mode sensor data from a mobile communications device; and direct the drone to fly based at least in part on the active mode sensor data.

Example 9 may include the subject matter of Example 8, wherein the active mode sensor data is based at least in part on an acceleration of the mobile communications device, and wherein the navigation module is further to: alter the flight path in a manner proportional to the acceleration; and direct the drone to fly based at least in part on the altered flight path.

Example 10 may include the subject matter of any one of Examples 4-9, wherein the navigation module is further to: receive a stop flight command from a mobile communications device; and direct the drone to fly to within a predefined distance from the mobile communications device.

Example 11 may include the subject matter of any one of Examples 4-10, wherein the navigation module is further to: receive sensor data from an object; determine a movement path of the object based at least in part on the sensor data; alter the flight path based at least in part on the movement path to generate a mimic object flight path; and direct the drone to fly based at least in part on the mimic object flight path.

Example 12 may include the subject matter of any one of Examples 4-11, wherein the navigation module is further to: receive object tracking sensor data from one or more object tracking sensors; determine a movement path of an object based at least in part on the object tracking sensors; alter the flight path based at least in part on the movement path to generate a mimic object flight path; and direct the drone to fly based at least in part on the mimic object flight path.

Example 13 may include a computer implemented drone controlling method comprising: receiving sensor data, at a computing device, from one or more sensor devices that depict a user gesture in three dimensional space; determining, by the computing device, a flight path based at least in part on the sensor data; and storing, by the computing device, the flight path for use to control operation of a drone.

Example 14 may include the subject matter of Example 13, wherein the drone includes the one or more sensor devices and the user gesture is made using the drone.

Example 15 may include the subject matter of Example 13, wherein a mobile communications device includes the one or more sensor devices and the user gesture is made using the mobile communications device.

Example 16 may include the subject matter of any one of Examples 13-15, further comprising: receiving, by the computing device, a flight modification command; and directing the drone to fly based at least in part on the flight modification command.

Example 17 may include the subject matter of any one of Examples 13-16, further comprising: receiving, by the computing device, an active mode command; and directing the drone to fly based at least in part on active mode sensor data from a mobile communications device.

Example 18 may include at least one computer-readable medium comprising instructions stored thereon that, in response to execution of the instructions by one or more processors of a computing device, cause the computing device to: receive sensor data from one or more sensor devices that depict a user gesture in three dimensional space; determine a flight path based at least in part on the sensor data; and store the flight path in a memory for use to control operation of a drone.

Example 19 may include the subject matter of Example 18, wherein the one or more sensor devices include at least one of a position sensor, an accelerometer, a gyroscope, a magnetometer, an ultrasonic sensor, an inertial sensor, or an optical sensor.

Example 20 may include the subject matter of any one of Examples 18-19, wherein: the computing device is further caused to transmit the flight path to a drone; a mobile communications device includes the one or more sensor devices; and the user gesture is made using the mobile communications device.

Example 21 may include the subject matter of any one of Examples 18-20, wherein the user gesture is a first user gesture and the computing device is further caused to: receive a mode command indicating whether the computing device is in an active mode; receive active sensor data from the one or more sensor devices that depict a second user gesture in three dimensional space; and transmit a signal to the drone while the drone is flying based at least in part on the active sensor data in response to the mode command indicates the computing device is in an active mode.

Example 22 may include the subject matter of any one of Examples 18-21, wherein the computing device is further caused to: receive a flight modification command; and transmit a flight modification signal to the drone while the drone is flying based at least in part on the modification command, wherein the modification command includes at least one of a scale command or a repetition command.

Example 23 may include the subject matter of Example 22, wherein the modification command is a voice command.

Example 24 may include the subject matter of any one of Examples 18-23, wherein the computing device is further caused to: receive a stop flight command; and transmit a signal to the drone while the drone is flying based at least in part on the stop flight command, wherein the signal includes data directing the drone to return to a starting point.

Example 25 may include the subject matter of any one of Examples 18-24, wherein the computing device is further caused to receive a drone selection command, wherein the computing device is caused to transmit the flight path to a drone based at least in part on the drone selection command.

Example 26 may include an electronic drone controlling device comprising: means for receiving sensor data from one or more sensor devices that depict a user gesture in three dimensional space; means for determining a flight path based at least in part on the sensor data; and means for storing the flight path for use to control operation of a drone.

Example 27 may include the subject matter of Example 26, wherein the drone includes the one or more sensor devices and the user gesture is made using the drone.

Example 28 may include the subject matter of Example 26, wherein a mobile communications device includes the one or more sensor devices and the user gesture is made using the mobile communications device.

Example 29 may include the subject matter of any one of Examples 26-28, further comprising: means for receiving a flight modification command; and means for directing the drone to fly based at least in part on the flight modification command.

Example 30 may include the subject matter of any one of Examples 26-29, further comprising: means for receiving an active mode command; and means for directing the drone to fly based at least in part on active mode sensor data from a mobile communications device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An electronic drone controlling device comprising:
   one or more processors;
   a memory coupled with the one or more processors;
   a translation module operated by the one or more processors to:
      receive sensor data from one or more sensor devices that depict a preflight user drone training gesture along a training path in three dimensional space;
      receive one or more of a scale command or a repetition command;
      determine a flight path based at least in part on the sensor data;
      adjust the flight path based at least in part on one or more of the scale command or the repetition command;
      store the adjusted flight path and an identifier associated with the adjusted flight path in the memory; and
   a navigation module operated by the one or more processors to retrieve the adjusted flight path from the memory in response to a user selection of the identifier associated with the adjusted flight path, and direct a drone to fly based at least in part on the retrieved adjusted flight path, wherein the preflight user drone training gesture and the one or more of the scale command or the repetition command are to be received before drone flight while the drone is not flying.

2. The electronic drone controlling device of claim 1, wherein the one or more sensor devices include at least one of a position sensor, an accelerometer, a gyroscope, a magnetometer, an ultrasonic sensor, an inertial sensor, or an optical sensor.

3. The electronic drone controlling device of claim 1, wherein the drone includes the one or more sensor devices, and the user gesture is made using the drone.

4. The electronic drone controlling device of claim 3, wherein the navigation module is further to:
   receive a flight modification command from a mobile communications device;
   alter the flight path based at least in part on the flight modification command; and
   direct the drone to fly based at least in part on the altered flight path.

5. The electronic drone controlling device of claim 4, wherein the flight modification command includes at least one of a scale command or a repetition command.

6. The electronic drone controlling device of claim 5, wherein the flight modification command is a voice command.

7. The electronic drone controlling device of claim 1, wherein the navigation module is further to: receive active mode sensor data from a mobile communications device; and direct the drone to fly based at least in part on the active mode sensor data.

8. The electronic drone controlling device of claim 7, wherein the active mode sensor data is based at least in part on an acceleration of the mobile communications device, and wherein the navigation module is further to:
alter the flight path in a manner proportional to the acceleration; and
direct the drone to fly based at least in part on the altered flight path.

9. The electronic drone controlling device of claim 1, wherein the navigation module is further to: receive a stop flight command from a mobile communications device; and direct the drone to fly to within a predefined distance from the mobile communications device.

10. The electronic drone controlling device of claim 1, wherein the navigation module is further to: receive sensor data from an object; determine a movement path of the object based at least in part on the sensor data; alter the flight path based at least in part on the movement path to generate a mimic object flight path; and direct the drone to fly based at least in part on the mimic object flight path.

11. The electronic drone controlling device of claim 1, wherein the navigation module is further to: receive object tracking sensor data from one or more object tracking sensors; determine a movement path of an object based at least in part on the object tracking sensors; alter the flight path based at least in part on the movement path to generate a mimic object flight path; and direct the drone to fly based at least in part on the mimic object flight path.

12. A computer implemented drone controlling method comprising:
receiving sensor data, at a computing device, from one or more sensor devices that depict a plurality of preflight user drone training gestures that moves the one or more sensor devices along a training path in three dimensional space while a drone is not flying;
determining, by the computing device, a flight path based at least in part on the sensor data, wherein the flight path is based at least in part on an average version of the plurality of preflight user drone training gestures;
storing, by the computing device, the flight path in a memory;
retrieving the flight path from the memory in response to a user selection of the flight path; and
directing the drone to fly based at least in part on the retrieved flight path.

13. The method of claim 12, wherein the drone includes the one or more sensor devices and the user gesture is made using the drone.

14. The method of claim 12, wherein a mobile communications device includes the one or more sensor devices and the user gesture is made using the mobile communications device.

15. The method of claim 12, further comprising:
receiving, by the computing device, a flight modification command; and
directing the drone to fly based at least in part on the flight modification command.

16. The method of claim 12, wherein the sensor data is included in a first set of sensor data, the method further comprising:
receiving, by the computing device while the drone is flying, a mode command; and
directing the drone to fly based at least in part on a second set of sensor data from a mobile communications device in response to the mode command.

17. At least one non-transitory computer-readable medium comprising instructions stored thereon that, in response to execution of the instructions by one or more processors of a computing device, cause the computing device to:
determine whether a preflight training mode has been selected;
receive sensor data from one or more sensor devices that depict a preflight user drone training gesture along a training path in three dimensional space while a drone is not flying in response to a determination that the preflight training mode has been selected;
determine a flight path based at least in part on the sensor data;
store the flight path and an identifier associated with the flight path in a memory;
retrieve the flight path from the memory in response to a user selection of the identifier associated with the flight path; and
direct the drone to fly based at least in part on the retrieved flight path.

18. The at least one non-transitory computer-readable medium of claim 17, wherein the one or more sensor devices include at least one of a position sensor, an accelerometer, a gyroscope, a magnetometer, an ultrasonic sensor, an inertial sensor, or an optical sensor.

19. The at least one non-transitory computer-readable medium of claim 17, wherein, in response to execution of the instructions by the one or more processors of the computing device, the computing device is further caused to transmit the flight path to a drone, and wherein:
a mobile communications device includes the one or more sensor devices; and
the user gesture is made using the mobile communications device.

20. The at least one non-transitory computer-readable medium of claim 19, wherein the preflight user drone training gesture is a first user gesture, the sensor data is included in a first set of sensor data, and, in response to execution of the instructions by one or more processors of the computing device while the drone is flying, the computing device is further caused to:
receive a mode command;
receive a second set of sensor data from the one or more sensor devices that depict a second user gesture in three dimensional space; and
transmit a signal to the drone while the drone is flying based at least in part on the second set of sensor data in response to the mode command.

21. The at least one non-transitory computer-readable medium of claim 19, wherein, in response to execution of the instructions by one or more processors of the computing device, the computing device is further caused to:
receive a flight modification command; and
transmit a flight modification signal to the drone while the drone is flying based at least in part on the modification command, wherein the modification command includes at least one of a scale command or a repetition command.

22. The at least one non-transitory computer-readable medium of claim 21, wherein the modification command is a voice command.

23. The at least one non-transistory computer-readable medium of claim 19, wherein, in response to execution of the instructions by one or more processors of the computing device, the computing device is further caused to:
- receive a stop flight command; and
- transmit a signal to the drone while the drone is flying based at least in part on the stop flight command, wherein the signal includes data directing the drone to return to a starting point.

24. The at least one non-transitory computer-readable medium of claim 19, wherein, in response to execution of the instructions by one or more processors of the computing device, the computing device is further caused to receive a drone selection command, wherein the drone selection command indicates one or more drones selected from a plurality of drones and the computing device is caused to transmit the flight path to the drone based at least in part on the drone selection command.

* * * * *